United States Patent
Dhillon et al.

(10) Patent No.: US 10,108,935 B2
(45) Date of Patent: Oct. 23, 2018

(54) CALENDAR ADJUSTING DEVICE

(71) Applicant: INTERNATIONAL BUSINESS MACHINES CORPORATION, Armonk, NY (US)

(72) Inventors: Jill S. Dhillon, North Hollywood, CA (US); James R. Kozloski, New Fairfield, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 14/661,441

(22) Filed: Mar. 18, 2015

(65) Prior Publication Data
US 2016/0275457 A1    Sep. 22, 2016

(51) Int. Cl.
*G06Q 10/10* (2012.01)
*G04G 13/02* (2006.01)

(52) U.S. Cl.
CPC ......... *G06Q 10/1095* (2013.01); *G04G 13/02* (2013.01); *G06Q 10/1093* (2013.01)

(58) Field of Classification Search
USPC ....................................................... 705/7.19
See application file for complete search history.

(56) References Cited

U.S. PATENT DOCUMENTS

| | | | |
|---|---|---|---|
| 4,645,353 A * | 2/1987 | Kavoussi | G04B 25/00 368/12 |
| 6,236,622 B1 | 5/2001 | Blackman | |
| 6,419,629 B1 | 7/2002 | Balkin et al. | |
| 7,384,394 B2 | 6/2008 | Hursh et al. | |
| 7,821,874 B2 | 10/2010 | Liu et al. | |
| 2009/0207028 A1 * | 8/2009 | Kubey | A61B 3/113 340/575 |

(Continued)

FOREIGN PATENT DOCUMENTS

| CN | 102508428 A | 6/2012 |
|---|---|---|
| WO | 2005000385 A1 | 1/2005 |

OTHER PUBLICATIONS

Siewiorek et al. (SenSay: A Context-Aware Mobile Phone, Siewiorek et al., ISWC 2003, cited from Wayback Machine Mar. 31, 2004—https://web.archive.org/web/20040331022402/http://www-2.cs.cmu.edu:80/~aura/docdir/sensay_iswc.pdf).*

(Continued)

*Primary Examiner* — Johnna R Loftis
*Assistant Examiner* — Matthew D Henry
(74) *Attorney, Agent, or Firm* — Law Office of Jim Boice

(57) ABSTRACT

A calendar adjusting device adjusts an electronic calendar. A network interface provides a communication link between the calendar adjusting device and an electronic calendar server that serves an electronic calendar. The electronic calendar includes a calendar entry for a scheduled event, and the calendar entry is associated with metadata that describe a scheduled time and date for the scheduled event and a non-temporal attribute of the scheduled event. A user monitoring hardware monitors a cognitive state of a user of the electronic calendar. An electronic calendar modification logic generates and transmits, via the communication link between the calendar adjusting device and the electronic calendar server, a modification to the calendar entry based on the metadata and the user's cognitive state.

16 Claims, 8 Drawing Sheets

(56) References Cited

U.S. PATENT DOCUMENTS

| | | | |
|---|---|---|---|
| 2011/0235469 A1* | 9/2011 | Irwin | G04G 13/02 |
| | | | 368/12 |
| 2012/0120773 A1 | 5/2012 | O'Toole | |
| 2013/0018284 A1 | 1/2013 | Kahn et al. | |
| 2013/0043988 A1 | 2/2013 | Bruno | |
| 2013/0198271 A1 | 8/2013 | Yu et al. | |
| 2014/0107493 A1* | 4/2014 | Yuen | H04W 4/027 |
| | | | 600/473 |
| 2014/0114889 A1* | 4/2014 | Dagum | G06F 19/3406 |
| | | | 706/12 |
| 2014/0171146 A1 | 6/2014 | Ma et al. | |
| 2014/0204718 A1* | 7/2014 | Heinberg | G06Q 10/109 |
| | | | 368/47 |
| 2014/0269223 A1 | 9/2014 | Mokhnatkina et al. | |
| 2014/0278057 A1* | 9/2014 | Berns | G01C 21/3484 |
| | | | 701/410 |
| 2014/0379273 A1* | 12/2014 | Petisce | A61B 5/14532 |
| | | | 702/19 |

OTHER PUBLICATIONS

A. Henry, "Five Best Sleep Tracking Gadgets or Apps", The High Five, lifehacker.com, Mar. 31, 2013, pp. 1-10.

M. Terman et al., "Controlled Trial of Naturalistic Dawn Simulation and Negative Air Ionization for Seasonal Affective Disorder", American Journal of Psychiatry, 163:12, Dec. 2006, pp. 2126-2133.

A. Henry, "Sleep Time Alarm Clock for Android Watches Your Sleep Cycles, Wakes You Gently", lifehacker.com, Sep. 12, 2012, pp. 1-9.

Anonymous, "Alarm Clock Pillow", Build18, build18.org, last modified on Nov. 19, 2011, retrieved Mar. 18, 2015, pp. 1-2.

P. Mell et al., "The NIST Definition of Cloud Computing", National Institute of Standards and Technology, Information Technology Laboratory, Sep. 2011, pp. 1-7.

* cited by examiner

CALENDAR ADJUSTING DEVICE

BACKGROUND

The present disclosure relates to the field of electronic devices, and specifically to electronic devices that manage electronic calendars. Still more particularly, the present disclosure relates to a device that adjusts an electronic calendar based on a state of a user who is slated to participate in an event that is scheduled in the electronic calendar.

SUMMARY

In an embodiment of the present invention, a calendar adjusting device adjusts an electronic calendar. A network interface provides a communication link between the calendar adjusting device and an electronic calendar server that serves an electronic calendar. The electronic calendar contains a calendar entry for a scheduled event. The calendar entry is associated with metadata that describe a scheduled time and date for the scheduled event and a non-temporal attribute of the scheduled event. A user monitoring hardware monitors a cognitive and/or physiological state of a user of the electronic calendar. An electronic calendar modification logic generates and transmits, via the communication link between the calendar adjusting device and the electronic calendar server, a modification to the calendar entry based on the metadata and the user's cognitive/physiological state.

In an embodiment of the present invention, a method and/or computer program product modifies an electronic calendar. An electronic calendar is accessed by a calendar adjusting device. The electronic calendar contains a calendar entry for a scheduled event, and the electronic calendar is served by an electronic calendar server. The calendar entry is associated with metadata that describe a scheduled time and date for the scheduled event and a non-temporal attribute of the scheduled event. A cognitive and/or physiological state of a user of the electronic calendar is monitored. A modification to the calendar entry is generated and transmitted, via a communication link between a calendar adjusting device and the electronic calendar server, to the calendar entry based on the metadata and the user's cognitive/physiological state.

DETAILED DESCRIPTION

Figure 1:
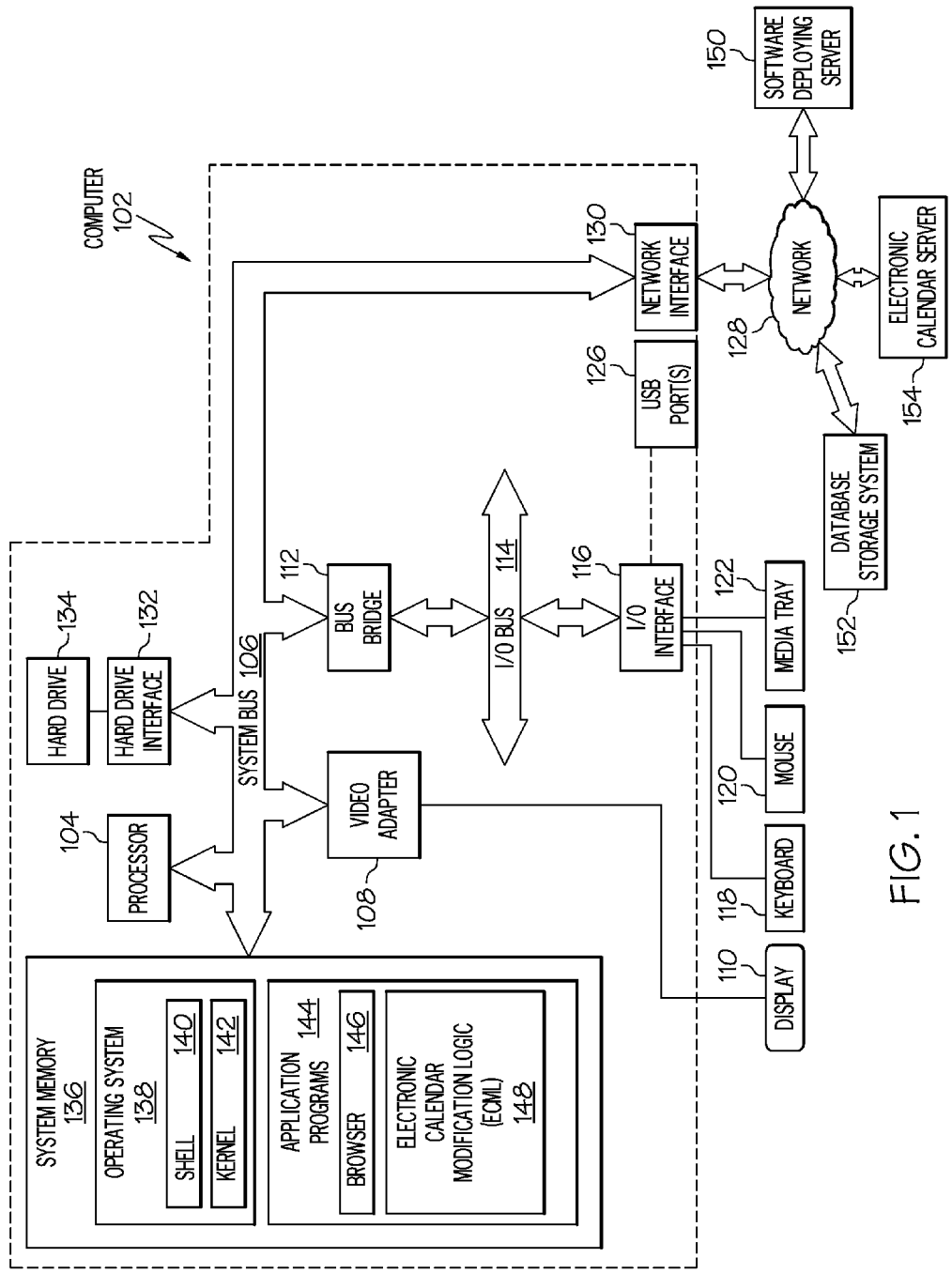
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or data storage system 152 and/or electronic calendar server 154 shown in FIG. 1, as well as calendar adjusting device 202, traffic information server 203, weather information server 204, electronic calendar server 254, and/or smart phone 280 shown in FIG. 2, and alarm clock 302 and/or non-user positioning device 331 shown in FIG. 3.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, electronic calendar server 154, and/or database storage system 152 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an electronic calendar modification logic (EMCL) 148. EMCL 148 includes code for implementing the processes described below, including those described in FIGS. 2-5. In one embodiment, computer 102 is able to download EMCL 148 from software deploying server 150, including in an on-demand basis, wherein the code in EMCL 148 is not downloaded until needed for execution. In one embodiment of the present invention, software deploying server 150 performs all of the functions associated with the present invention (including execution of EMCL 148), thus freeing computer 102 from having to use its own internal computing resources to execute EMCL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
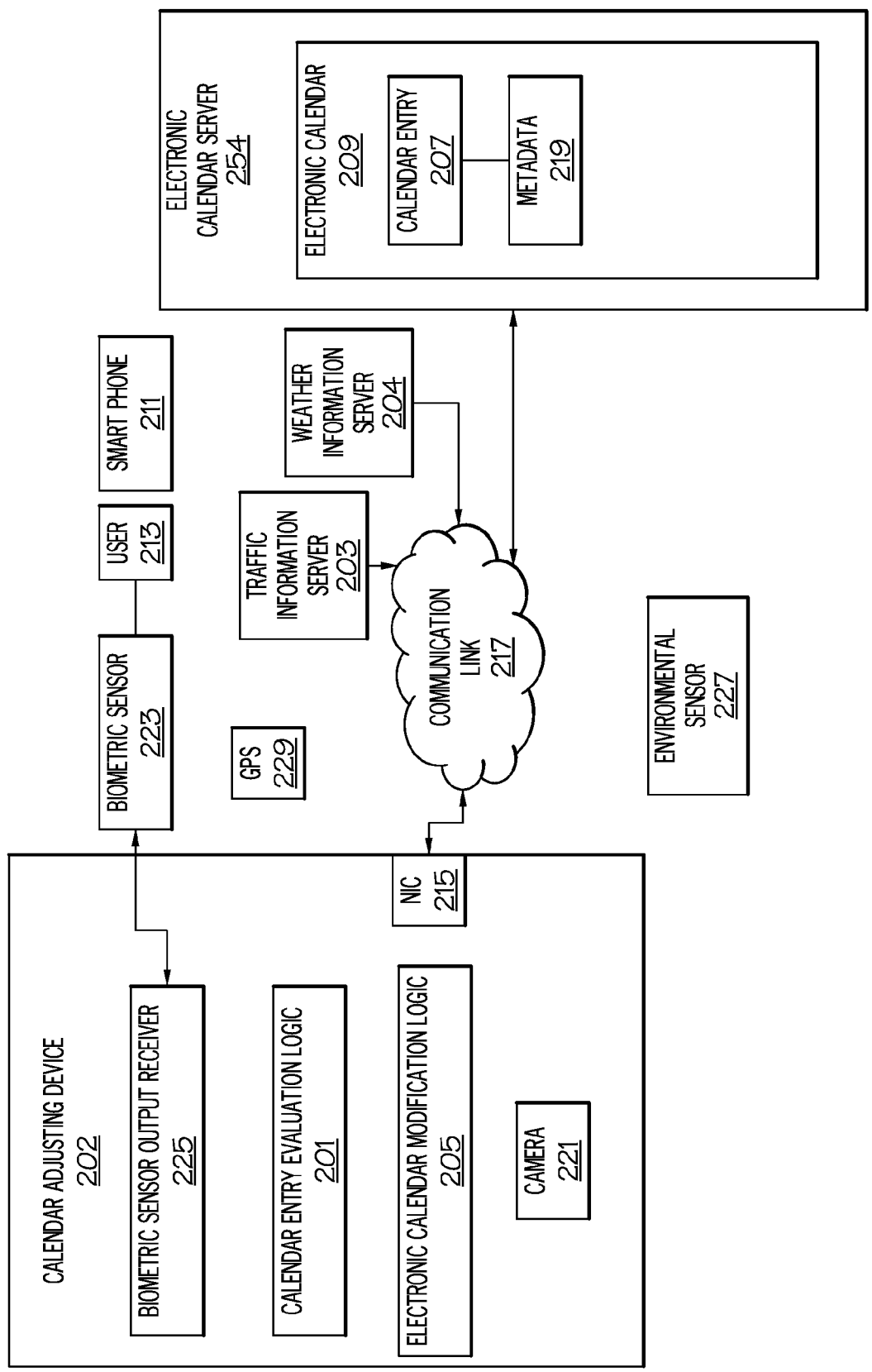
FIG. 2 illustrates an exemplary relationship between a novel calendar adjusting device and an electronic calendar server in accordance with one or more embodiments of the present invention.

With reference now to FIG. 2, an exemplary relationship between a novel calendar adjusting device 202 and an electronic calendar server 254 in accordance with one or more embodiments of the present invention is presented.

Calendar adjusting device 202 is an intelligent/cognitive device, which in one or more embodiments has one or more of the components of computer 102 shown in FIG. 1.

Calendar adjusting device 202 has a calendar entry evaluation logic 201 and an electronic calendar modification logic 205, which are able to adjust calendar entries (e.g., calendar entry 207) within an electronic calendar 209 found in an electronic calendar server 254 (analogous to electronic calendar server 154 shown in FIG. 1). Alternatively the electronic calendar 209 may be stored within the calendar adjusting device 202, or within a local device (e.g., a smart phone 211) that is used by the user 213.

As depicted in FIG. 2, calendar adjusting device 202 has a network interface, such as the depicted Network Interface Card (NIC) 215. NIC 215 provides a connection to a network, such as communication link 217, which enables communication between the calendar adjusting device 202 and the electronic calendar server 254 that serves up (stores/provides/accesses) the electronic calendar 209. Electronic calendar 209 is a calendar (e.g., a program running on a computer) that stores future scheduled events and/or a record of past events. Thus, as depicted in FIG. 2, the electronic calendar 209 has one or more calendar entries, including the depicted calendar entry 207, which describes a scheduled event (e.g., a meeting, a trip, a party, etc.)

As shown in FIG. 2, associated with calendar entry 207 is metadata 219. Metadata 219 provides information that describes the scheduled event depicted by calendar entry 207. Examples of metadata 219 include, but are not limited to, a description of a scheduled time and date for the scheduled event described by calendar entry 207 (i.e., when the scheduled event is scheduled to occur), and/or a non-temporal attribute of the scheduled event. A non-temporal attribute of the scheduled event is an attribute that does not describe when the event is to occur.

For example, assume that the scheduled event is a meeting at a particular location. Examples of non-temporal attributes associated with that meeting include, but are not limited to, the identities of the planned participants, the location of the meeting, the topic of the meeting, the predefined level of importance of the meeting, whether or not the meeting can be rescheduled if necessary (based on difficulty in meeting the schedules of the participants, whether or not it would be irresponsible to inconvenience one or more participants, etc.), the format of the meeting (e.g., whether it is a personal face-to-face meeting or a teleconference meeting), whether or not the meeting has been rescheduled during the night, for example by a meeting host residing in a different time zone, as well as other indicators of likelihood of attendance among meeting participants, etc.

In order to determine whether or not a calendar entry 207 should be adjusted, a state of the user 213 is determined. This state may be cognitive, emotional, or physical, according to various embodiments of the present invention.

For example, assume that a camera 221, which may be part of the calendar adjusting device 202 or may be part of another resource (e.g., the smart phone 211 used by the user) that is accessible by the calendar adjusting device 202, and which is capable of capturing still photos or moving video, preferably in a digital format such as a joint photographic experts group (JPEG) format or a moving picture experts group (MPEP) format. For example, assume that camera 221 captures an video of the user (e.g., user 213 shown in FIG. 2) while the user 213 is in bed. Assume further that the video shows the user 213 making movements while in bed that are typical of one who is severely sleep-deprived (e.g., jerking motions, lack of any movement, etc.). Video interpretation logic within the calendar adjusting device 202 (e.g., part of ECML 148 shown in FIG. 1, assuming that calendar adjusting device 202 has processing logic such as processor 104 shown in FIG. 1) will then determine the physiological state (i.e., extreme sleepiness) of user 213 based on these video images.

In another embodiment of the present invention, the state of the user is determined by a biometric sensor 223 (which monitors the user 213) in conjunction with a biometric sensor output receiver 225. Biometric sensor 223 monitors biometrics of user 213. Examples of biometric sensor 223 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), a pyloerection detector (e.g., a sensor of hair follicle muscle contraction and a change in hair angles on the skin), an eye/pupil dilation detector (e.g., used with camera 221 to capture an image of the user/holder's eye pupils to indicate various emotions that are known to be associated with pupil dilation and/or pupil contraction, swollen eyelids, etc.), a thermometer (that measures the body temperature of the user 213), a microphone (e.g., to detect a breathing pattern of the holder of an electronic device such as a smart phone), an electroencephalogram (EEG) machine used to generate a representation of electrical activity of the brain (e.g., to indicate a state of deep sleep, light sleep, disturbed sleep, wakefulness, etc.), etc. Thus, biometric sensor 223 is an electronic device that gathers biometric data associated with a human. Biometric data is data that describes a medical state of a person (e.g., illness), a physiological movement of a person (e.g., eye movement), a cognitive state of a person (e.g., asleep or awake), a physiological condition of a person (e.g., sweating, increased blood pressure, etc.), etc.

Thus, readings of the biometric sensor 223 will determine how the electronic calendar 209 is affected. For example, if the biometric sensor 223 generates signals, which are interpreted by logic (e.g., ECML 148 and processor 104 shown in FIG. 1) within the biometric sensor output receiver 225 as being indicative of the user 213 being gravely ill (e.g., a thermometer reading of 105° F.), then electronic calendar modification logic 205 will send a message to the electronic calendar server 254 directing the cancellation of the meeting represented by calendar entry 207. However, if the biometric sensor 223 generates signals, which are interpreted by logic within the biometric sensor output receiver 225 as indications that user 213 merely needs more time to sleep (e.g., an eye detector detecting excessively swollen eyelids, indicating sleep deprivation), then electronic calendar modification logic 205 will send a message to the electronic calendar server 254 directing the rescheduling of the meeting represented by calendar entry 207 to later in the (same or different) day.

In accordance with one or more embodiments of the present invention, the electronic calendar modification logic 205 adjusts the calendar entry 207 not just on the state of the user 213 (e.g., sick/healthy, sleepy/alert, etc.), but also based on the nature of the event being calendared by the calendar entry 207.

Thus, in one embodiment of the present invention, the calendar adjusting device 202 includes, or has access to, calendar entry evaluation logic 201, which identifies a subject (topic) of the scheduled event based on the non-temporal attribute of the scheduled event, and the electronic calendar modification logic 205 adjusts calendar entry 207 based on the subject of the scheduled event. For example, assume that the calendar entry 207 describes a business meeting. If the business meeting is about a topic that has been predetermined to be highly important (e.g., a meeting with a new customer about a high-value contract), then it will not be adjusted in time, even if the user 213 is sleepy or sick (within reason). However, if the topic of the business meeting represented by calendar entry 207 is merely a casual update meeting with fellow co-workers, then the user 213 will be allowed to delay or even ignore the meeting. Other metadata considerations include the amount of preparation time, both cognitive and bodily (e.g., donning casual vs. business attire), for the meeting, based on the assessment of meeting importance.

In one or more embodiments of the present invention, the biometric sensor 223 and/or camera 221 and/or other device(s) determine that the user 213 is asleep (or at least is likely to be asleep).

For example, the biometric sensor 223 may determine that the user 213 is asleep due to illness, his/her sleep cycle, he/she recently went to bed, etc. (as determined by biometric sensor 223, camera 221, or even a keyboard of similar input from the user 213). Similarly, an environmental sensor 227 may be a light sensor that determines that a room is dark, a microphone that determines that a room is quiet, a motion detector that detects the user 213 moving around within a room, etc. Based on environmental conditions of the room in which the user 213 is located (e.g., is sleeping), an assumption can be made regarding whether or not the user 213 is awake or asleep. That is, if the room is dark and/or quiet and/or the user 213 is not moving about within the room, then an assumption can be made that the user 213 is asleep. However, if the room is brightly lit and/or noisy and/or the user is detected moving around within the room, than an assumption can be made that the user 213 is awake.

In one or more embodiments of the present invention, a global positioning system (GPS) 229, which is a space-based satellite navigation system that provides location information for a GPS-enabled device, such as the calendar adjusting device 202 and/or the smart phone 211, can be used to determine the location of the user 213. This GPS location can then be used to adjust the calendar entry 207. For example, assume that the GPS 229 identifies a geophysical location of the user 213, such as a street/city address. This information is then used to determine how much warning to give the user (e.g., using an alarm clock such as the alarm clock 302 shown in FIG. 3) before the scheduled event from the electronic calendar 209 (i.e., when an alarm should be produced by the alarm clock 302). In one embodiment, the GPS information is used to determine whether or not to adjust the calendar entry 207 at all. That is, if the GPS 229 determines that it would take too long for the user 213 to arrive at a meeting scheduled by the calendar entry 207 without waking him/her up too soon, then the alarm clock 302 will be disabled, thus allowing the user 213 to continue sleeping.

As discussed above, one embodiment of the present invention allows the user 213 to simply sleep through (or otherwise ignore) a scheduled meeting and/or to reschedule the scheduled meeting marked by the calendar entry 207. That is, whether asleep or awake, if the physical (e.g., physically healthy or sick) and/or emotional (e.g., distracted or focused) and/or cognitive (e.g., asleep or awake) state of the user 213 indicates that he/she is not in condition to attend a meeting or engage in another activity represented by calendar entry 207, then the user 213 is allowed to ignore the activity and continue sleeping, resting, etc.

Figure 3:
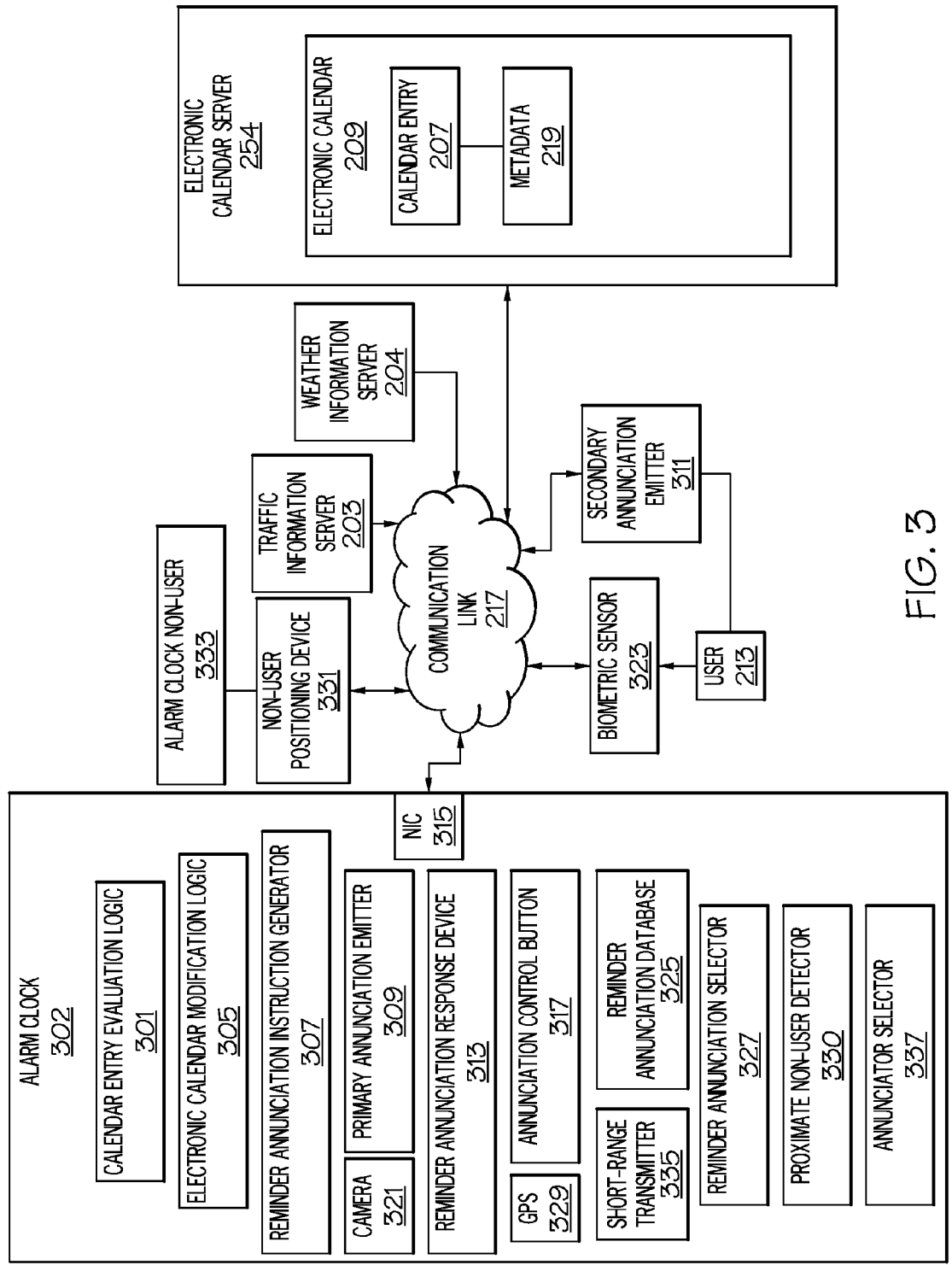
FIG. 3 depicts detail of a novel alarm clock used to determine a cognitive and/or physiological state of a user when adjusting an electronic calendar according to one or more embodiments of the present invention.

In one embodiment of the present invention, a notification of the calendar entry 207 (and thus awakening or otherwise alerting user 213) is achieved through an intelligent alarm clock, such as the alarm clock 302 shown in FIG. 3, which further adjusts the calendar entry 207 based on how the user 213 responds to a warning alarm about the event associated with the calendar entry 207.

With reference now to FIG. 3, details of a novel alarm clock 302 used to further determine a cognitive state of a user and/or further adjust the electronic calendar 209 according to one or more embodiments of the present invention are presented. Alarm clock 302 is an intelligent/cognitive device (which in one or more embodiments has one or more of the components of computer 102 shown in FIG. 1) that is designed to emit an annunciation (i.e., a "reminder annunciation"), which may be audible or visual, that awakens or otherwise provides a warning/alarm to a user that a particular time has been reached.

For example, alarm clock 302 may be set to awaken the user at the same time (e.g., 7:00 AM) each morning with an audible alarm, a flashing light, etc. However, in the present invention, alarm clock 302 has additional capabilities (described herein) due to its interconnection with an electronic calendar, such as electronic calendar 209 that is served by the electronic calendar server 254 introduced in FIG. 2.

As depicted in FIG. 3, alarm clock 302 has a network interface, such as the depicted Network Interface Card (NIC) 315 (similar to NIC 215 shown in FIG. 2). NIC 315 provides a connection to a network, such as communication link 217, which enables communication between the alarm clock 302 and the electronic calendar server 254 that serves up (stores/provides/accesses) the electronic calendar 209.

As shown in FIG. 3, the alarm clock 302 has a reminder annunciation instruction generator 307. Reminder annunciation instruction generator 307 generates a reminder annunciation instruction for the scheduled event represented by calendar entry 207. The reminder annunciation instruction generator 307 then transmits the reminder annunciation instruction to one or more annunciation emitters, including but not limited to a primary annunciation emitter 309 that is part of (or dedicated to) alarm clock 302. Examples of the output of primary annunciation emitter 309 include, but are not limited to, buzzers, chimes, nature sounds, etc. that are created by an audio driver and a speaker within the primary annunciation emitter 309 (or any other annunciation emitter, such as a secondary annunciation emitter 311); a synthetic voice generated by a voice synthesizer that generates a verbal message that is created by voice generation software, an audio driver, and a speaker that are part of or associated with the primary annunciation emitter 309 and/or other annunciation emitters; etc.

Another example of an annunciation emitter such as primary annunciation emitter 309 is a light emitter that is illuminated according to instructions from the reminder annunciation (e.g., a light flashes off and on, slowly turns brighter, etc.). This light emitter may also be directed to emit certain colors, light intensities, flashing patterns, etc., that specifically identify a particular scheduled event found in the electronic calendar 209. For example, a flashing light may suggest a mission critical meeting (identified by calendar entry 207) is upcoming, while a slowing increasing level of illumination may suggest a casual social meeting is upcoming.

Another example of an annunciation emitter such as primary annunciation emitter 309 is a scent emitter, which emanates one or more scents. For example, a reservoir of various odorants (perfumes, scents that mimic certain smells found in nature, etc.) within the alarm clock 302 can selectively be tapped by an odor generating device (e.g., a heater that vaporizes the odorant) according to instructions from the reminder annunciation. Thus, various smells are reserved for, and thus remind the user of, a particular type of scheduled event found in the electronic calendar 209.

As shown in FIG. 3, alarm clock 302 also includes a reminder annunciation response device 313. Reminder annunciation response device 313 is a hardware device that detects a user's physiological response to the reminder annunciation. Reminder annunciation response device 313 takes on various embodiments in one or more embodiments of the present invention.

For example, reminder annunciation response device 313 may be an off button or a snooze button, depicted in FIG. 3 as an annunciation control button 317. However, the mere act of the user hitting the off/snooze button alone does not provide an indication of the user's physiological response to the reminder annunciation. Rather, it is how the user hits (depresses or otherwise engages) the off/snooze button that indicates his/her physiological response to the reminder annunciation. For example, assume that the user hits the snooze button more than three times within five minutes. Logic (e.g., part of the reminder annunciation response device 313) within or otherwise associated with the alarm clock 302 can look up response patterns in a lookup table. For example, an entry in the lookup table may describe "activating the snooze button more than three times within five minutes", which is associated with a corresponding entry in the lookup table describing "excessive fatigue" or some other physiological state of the user when he/she responds to the alarm's snooze button. The electronic calendar modification logic 305 will use this information in deciding how the calendar entry 207 will be modified, if at all.

In another embodiment of the present invention, the reminder annunciation response device 313 works in conjunction with a camera 321 (analogous to camera 221 shown in FIG. 2), which may be part of the alarm clock 302 or may be part of another resource (e.g., the smart phone 211 shown in FIG. 2) that is accessible by the alarm clock 302, and which is capable of capturing still photos or moving video, preferably in a digital format such as a joint photographic experts group (JPEG) format or a moving picture experts group (MPEP) format. For example, assume that camera 321 captures an video of the user 213 when the alarm goes off (i.e., sound/light is emitted from primary annunciation emitter 309 in response to receiving a reminder annunciation instruction from the reminder annunciation instruction generator 307). Assume further that the video shows the user 213 making movements towards that alarm clock 302 that are typical of one who is severely sleep-deprived (e.g., flopping hand motions, uncoordinated body movement, etc.). Video interpretation logic within the alarm clock 302 (e.g., part of ECML 148 shown in FIG. 1, assuming that alarm clock 302 has processing logic such as processor 104 shown in FIG. 1) will then determine the physiological state (i.e., extreme sleepiness) of user 213 based on these video images.

In another embodiment of the present invention, the reminder annunciation response device 313 works in conjunction with one or more biometric sensors, such as the biometric sensor 323 (analogous to the biometric sensor 223 depicted in FIG. 2) that monitors biometrics of user 213.

Thus, readings generated by the biometric sensor 323 will further determine how the electronic calendar 209 is affected. For example, if the biometric sensor 323 generates signals, which are interpreted by logic (e.g., ECML 148 and processor 104 shown in FIG. 1) within the reminder annunciation response device 313 as being indicative of the user 213 being gravely ill (e.g., a thermometer reading of 105° F.), then the electronic calendar modification logic 305 (analogous to the electronic calendar modification logic 205 depicted in FIG. 2) will send a message to the electronic calendar server 254 directing the cancellation of the meeting represented by calendar entry 207, thereby further modifying the calendar entry 207 beyond that which was performed by the electronic calendar modification logic 205 shown in the calendar adjusting device 202 in FIG. 2. However, if the biometric sensor 323 generates signals, which are interpreted by logic within the reminder annunciation response device 313 as indications that user 213 merely needs more time to sleep (e.g., an eye detector detecting excessively swollen eyelids, indicating sleep deprivation), then alarm clock 302 will send a message to the electronic calendar server 254 directing the rescheduling of the meeting represented by calendar entry 207 to later in the day (or the next day).

Thus, as shown in FIG. 3, alarm clock 302 includes an electronic calendar modification logic 305 that generates and transmits, via the communication link 217 between the alarm clock 302 and the electronic calendar server 254, instructions to modify (or further modify) the calendar entry 207 based on the user's physiological response to the reminder annunciation, as described herein. That is, the calendar adjusting device 202 shown in FIG. 2 performs the initial adjustment to the calendar entry 207. Thereafter, and based on how the user 213 responds to an alarm or other annunciation from the alarm clock 302, then the alarm clock 302 (or the calendar adjusting device 202, assuming that the calendar adjusting device 202 is in communication with the alarm clock 302) further adjusts the calendar entry 207.

In one embodiment of the present invention, the alarm clock 302 also includes (or otherwise has access to) a reminder annunciation database 325 of reminder annunciations. Each of the reminder annunciations is associated with a particular non-temporal attribute of one or more events. For example, one reminder annunciation (e.g., a soft chime sound) may be associated with a reminder of an upcoming social meeting, while another reminder annunciation (e.g., a blaring klaxon sound) may be associated with a reminder of a scheduled critical military mission. A reminder annunciation selector 327 (e.g., part of ECML 148 shown in FIG. 1) then selects, from the reminder annunciation database 325, a particular reminder annunciation that matches the non-temporal attribute of the scheduled event, such that the reminder annunciation instruction generator 307 generates a particular reminder annunciation that matches the non-temporal attribute of the scheduled event. That is, a soft chime sound will be generated for an upcoming social meeting, while a blaring klaxon sound will be generated for a scheduled critical military mission.

In one embodiment of the present invention, in which the primary annunciation emitter 309 on the alarm clock 302 is a speaker (and thus the reminder annunciation is audible), a proximate non-user detector 330 receives a signal from a non-user positioning device 331 that identifies a location of an alarm clock non-user 333 (i.e., a person who is not a user of the alarm clock 302, but nonetheless may be in the same room as the alarm clock 302). For example, assume that the user 213 (introduced in FIG. 2) is a person who utilizes the alarm clock 302, while alarm clock non-user 333 is another person who does not use the alarm clock 302, but nonetheless is within hearing distance of the alarm clock 302 (e.g., a roommate, spouse, etc.). The non-user positioning device 331 will determine that the other person is in fact within hearing distance of the alarm clock 302.

In one or more embodiments, the non-user positioning device 331 may be a positioning system such as the depicted global positioning system (GPS) 329 (analogous to GPS 229 shown in FIG. 2), which in these embodiments is not associated with the alarm clock 302, but rather is associated with (e.g., within a smart phone held by) the alarm clock non-user 333. In a preferred embodiment however, the positioning system is a positioning system that receives signals from a short-range transmitter 335 within the alarm clock. The range of the short-range transmitter 335 is adjusted to be the same distance that is within hearing range of the primary annunciation emitter 309. That is, if the non-user positioning device 331 is a receiver (e.g., within a smart phone held by the alarm clock non-user 333) that is unable to detect signals from the short range transmitter 335, then a conclusion is drawn that the alarm clock non-user 333 is likewise unable to hear the primary annunciation emitter 309, since the range of the short-range transmitter 335 and the audible range of the primary annunciation emitter 309 have been calibrated to be the same. Thus, if the sound level of sounds generated by the primary annunciation emitter 309 goes up or down, the strength of the signal from the short-range transmitter 335 will also automatically go up or down in a proportional manner. Thus, if the receiver in the non-user positioning device 331 is able to receive ("hear") the transmission from the short-range transmitter 335, then the alarm clock non-user 333 is also within hearing distance of the primary annunciation emitter 309 within the alarm clock 302.

The reminder annunciation instruction generator 307 is able to interrogate the non-user positioning device 331 via the communication link 217. If the non-user positioning device 331 is currently able to hear/receive signals (which may be continuously emitted) from the short-range transmitter 335, this state of reception is transmitted to the reminder annunciation instruction generator 307.

Thus, if the proximate non-user detector 330 (along with the reminder annunciation instruction generator 307) determines that the alarm clock non-user 333 is close enough to the alarm clock to hear (and thus be disturbed by) the primary annunciation emitter 309, then an annunciator selector 337 will cancel the transmission of the reminder annunciation instruction from the reminder annunciation instruction generator 307 to the primary annunciation emitter 309, and will instruct the reminder annunciation instruction generator 307 to transmit the reminder annunciation instruction to the secondary annunciation emitter 311, which generates a reminder annunciation that is silent or otherwise designed to not disturb the alarm clock non-user 333 (e.g., a vibration signal on a smart watch being worn by user 213). That is, if alarm clock non-user 333 is close enough to alarm clock 302 to be disturbed by the primary annunciation emitter 309, then the primary annunciation emitter 309 is not used, and a silent (e.g., vibrating) secondary annunciation emitter 311 is used instead. That is, the second annunciation emitter 311 generates a reminder annunciation that is imperceptible to the alarm clock non-user 333. Furthermore, the non-user positioning device 331 and/or the proximate non-user detector 330 may access calendar and metadata information about the non-user in order to determine the appropriateness of these actions. That is, the non-user positioning device 331 and/or the proximate non-user detector 330 may access a profile database for the alarm clock non-user 333, which describes his/her role, title, job description, sleep history, etc.

In one embodiment of the present invention, the GPS 329 shown in FIG. 3 identifies a geophysical location of the alarm clock 302, such as a street/city address. This information is then used to determine how much warning to give the user before the scheduled event from the electronic calendar 209 (i.e., when the reminder annunciation should be produced by the primary annunciation emitter 309 on the alarm clock 302). In one embodiment, the lead time before the scheduled event (i.e., the time that the reminder annunciation is produced) is further adjusted according to current traffic and weather conditions.

For example, the NIC 315 may provide access to the traffic information server 203 shown in FIG. 2, which provides real-time information about vehicular traffic between a location of the alarm clock 302 and a location of the scheduled event (as identified by the metadata 219 associated with the calendar entry 207). Based on this information (e.g., unusually heavy traffic, accidents, etc.), the reminder annunciation instruction generator 307 adjusts a time at which the reminder annunciation is emitted (i.e., based on the real-time information about the vehicular traffic between the geophysical location of the alarm clock 302 and the location of the scheduled event). That is, if the traffic information server 203 provides information about a heavy traffic backup going to the meeting site, then the user of the alarm clock 302 is awakened earlier than previously scheduled.

Similarly, the NIC 315 may provide access to the weather information server 204 introduced in FIG. 2, which provides real-time information about weather conditions at the location of the scheduled meeting, weather conditions at the location of the alarm clock 302, and/or weather conditions of the roads between the alarm clock 302 and the scheduled meeting location. Based on this information, the reminder annunciation instruction generator 307 adjusts a time at which the reminder annunciation is emitted from the primary annunciation emitter 309 based on the real-time information about the weather at the location of the scheduled event, the location of the alarm clock 302, and/or the roads between the two.

While various components are depicted in FIG. 3 as being integral to and/or within the alarm clock 302, alternatively such components may be stored in another device/resource, such as a supervisory computer (not depicted, but accessible via communication link 217) that monitors, manages, and otherwise performs actions associated with the alarm clock 302 and/or the electronic calendar 209.

Figure 4:
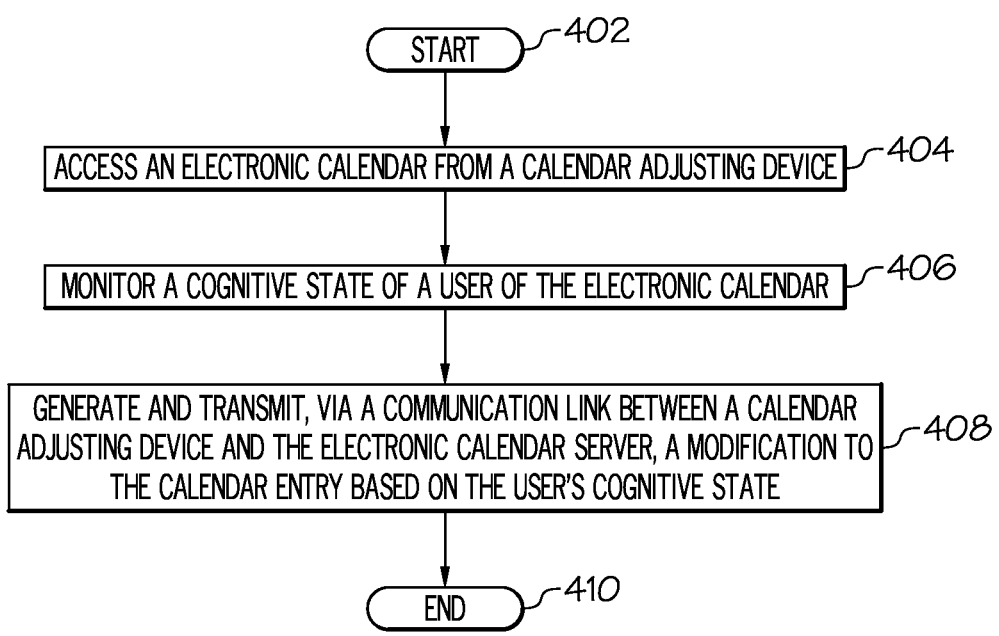
FIG. 4 is a high-level flow chart of one or more steps performed by one or more devices to adjust an electronic calendar.

With reference now to FIG. 4, a high-level flow chart of one or more steps performed by one or more devices for modifying an electronic calendar according to a cognitive state of a user is presented.

After initiator block 402, a device (e.g., calendar adjusting device 202 shown in FIG. 2) accesses an electronic calendar (e.g., electronic calendar 209 shown in FIG. 2), as described in block 404. The electronic calendar includes a calendar entry (e.g., calendar entry 207 shown in FIG. 2) for a scheduled event. The electronic calendar is served by an electronic calendar server (e.g., electronic calendar server 254 shown in FIG. 2). The calendar entry is associated with metadata (e.g., metadata 219 shown in FIG. 2) that describe a scheduled time and date for the scheduled event and a non-temporal attribute of the scheduled event.

As described in block 406, a cognitive state of a user (e.g., user 213 shown in FIG. 2) of the electronic calendar is monitored (e.g., by the biometric sensor 223 and/or the biometric sensor output receiver 225 shown in FIG. 2).

As described in block 408, a modification to the calendar entry is generated and transmitted, via a communication link between a calendar adjusting device and the electronic calendar server, to the calendar entry based on the metadata and the user's cognitive state. That is, the calendar entry is modified based on the metadata (describing the time, subject, participants, etc.) of the meeting, as well as the current cognitive and/or physiological state of the user.

The flow-chart ends at terminator block 410.

In an embodiment of the present invention, the method further comprises identifying a subject of the scheduled event based on the non-temporal attribute of the scheduled event. The modification to the time at which the event represented by the calendar entry will occur is further based on the subject of the scheduled event.

In an embodiment of the present invention, a scheduled event represented by the calendar entry is a meeting, and the non-temporal attribute of the calendar entry is a description of scheduled participants of the meeting. In this embodiment, the modification to the calendar entry (i.e., when the scheduled event will occur) is further based on the scheduled participants of the meeting. For example, if the scheduled participants are extremely important persons, then the meeting may not be rescheduled at all, despite the physiological response from the alarm clock user.

Figure 5:
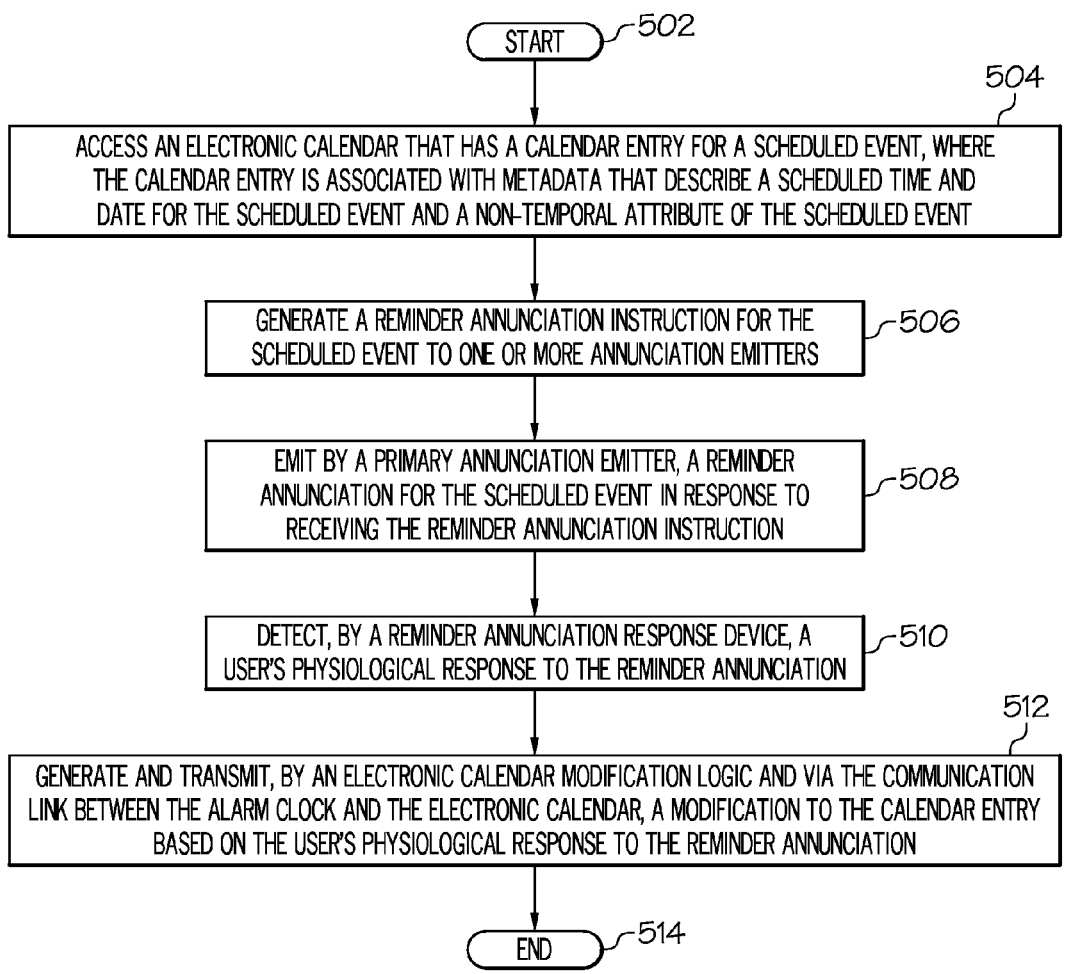
FIG. 5 is a high-level flow chart of one or more steps performed by an alarm clock to further adjust the electronic calendar.

With reference now to FIG. 5, a high-level flow chart of one or more steps performed by the novel alarm clock described herein to further adjust an electronic calendar is presented.

After initiator block 502, an electronic calendar (e.g., electronic calendar 209 shown in FIG. 3) is accessed from an electronic calendar server (e.g., electronic calendar server 254 shown in FIG. 3), as described in block 504. The electronic calendar includes a calendar entry (e.g., calendar entry 207 shown in FIG. 3) for a scheduled event. The calendar entry is associated with metadata (e.g., metadata 219 shown in FIG. 3) that describe a scheduled time and date for the scheduled event and a non-temporal attribute of the scheduled event, as discussed herein.

As described in block 506, a reminder annunciation instruction generator (e.g., reminder annunciation instruction generator 307 shown in FIG. 3) generates a reminder annunciation instruction for the scheduled event identified by the calendar entry from the electronic calendar. The reminder annunciation instruction generator transmits the reminder annunciation instruction to one or more annunciation emitters, including the primary annunciation emitter 309 shown in FIG. 3.

As described in block 508, a primary annunciation emitter (e.g., primary annunciation emitter 309 shown in FIG. 3) emits a reminder annunciation for the scheduled event in response to receiving the reminder annunciation instruction.

As described in block 510, a reminder annunciation response device (reminder annunciation response device 313 shown in FIG. 3) detects a user's physiological response to the reminder annunciation. As described in block 512, an electronic calendar modification logic (e.g., electronic calendar modification logic 305 shown in FIG. 3) generates and transmits, via the communication link between the alarm clock and the electronic calendar server, a modification to the calendar entry based on the user's physiological response to the reminder annunciation.

The user's physiological response to the reminder annunciation may be a physical action, such as engaging an off button, snooze button, etc., on the alarm clock. In another embodiment, the physiological response is a biometric response, such as an increase in heartrate, respiration, eye movement, etc., that is detected by a biometric sensor. In another embodiment, the physiological response is a lack of response, such as no new physical actions by the user and/or no change to biometric conditions of the user when the reminder annunciation is emitted. Thus, how the user does or does not respond to the reminder annunciation determines how the calendar entry is modified.

The flow-chart ends at terminator block 514.

In one embodiment of the present invention, the method further comprises identifying, by a calendar entry evaluation logic (e.g., calendar entry evaluation logic 301 shown in FIG. 3, which is analogous to calendar entry evaluation logic 201 shown in FIG. 2), a subject of the scheduled event based on the non-temporal attribute of the scheduled event. The reminder annunciation instruction generator then adjusts a time at which the reminder annunciation for the calendar entry is emitted based on the subject of the scheduled event.

In one embodiment of the present invention, the scheduled event is a meeting, the non-temporal attribute is a location of the meeting, and the method further modifies the reminder annunciation based on the location of the meeting (i.e., if the system determines that it will take a long amount of time to reach the location of the meeting, then the reminder annunciation is adjusted accordingly).

In one or more embodiments of the present invention, determining how long the user needs to prepare for the meeting (and thus when to emit the reminder annunciation) can be based on historical data. For example, if the user has historically taken one hour to prepare for a recurring weekly meeting with his/her team group, then the annunciation warning can initially be set for one hour prior to the meeting plus whatever usual travel/dressing/etc. personal time is needed by the user. However, if the user's physiological response indicates a need for additional time (e.g., based on being excessively tired, ill, etc.), then the meeting will be pushed forward accordingly, such that additional preparation time is allocated to the user.

In one embodiment of the present invention, the scheduled event is a meeting, the non-temporal attribute is a description of scheduled participants of the meeting, and the method further comprises further modifying the calendar entry based on the scheduled participants of the meeting. For example, if the scheduled participants are extremely important persons, then the meeting may not be rescheduled at all, despite the physiological response from the alarm clock user.

In one embodiment of the present invention, the primary annunciation emitter is a speaker, and the method further comprises receiving, by a proximate non-user detector (e.g., proximate non-user detector 330 shown in FIG. 3), a signal from a non-user positioning device (e.g., non-user positioning device 331 shown in FIG. 3) that identifies a location of a non-user (e.g., alarm clock non-user 333 shown in FIG. 3) of the alarm clock. In response to the proximate non-user detector determining that the non-user is proximate enough to the alarm clock to hear the primary annunciation emitter, then an annunciator selector (e.g., annunciator selector 337 shown in FIG. 3) cancels the transmission of the reminder annunciation instruction to the primary annunciation emitter, and transmits (redirects the reminder annunciation instruction generator 307 to transmit) the reminder annunciation instruction to a secondary annunciation emitter (e.g., second annunciation emitter 311 shown in FIG. 3), such that the secondary annunciation emitter generates a reminder annunciation that is silent (e.g., vibrates).

In one embodiment of the present invention, the method further receives traffic information from a traffic information server (e.g., traffic information server 203 shown in FIG. 3), which provides real-time information about vehicular traffic between a location of the alarm clock and a location of the scheduled event. Based on this information, the reminder annunciation instruction generator adjusts a time at which the reminder annunciation is emitted based on the real-time information about the vehicular traffic between the location of the alarm clock and the location of the scheduled event.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
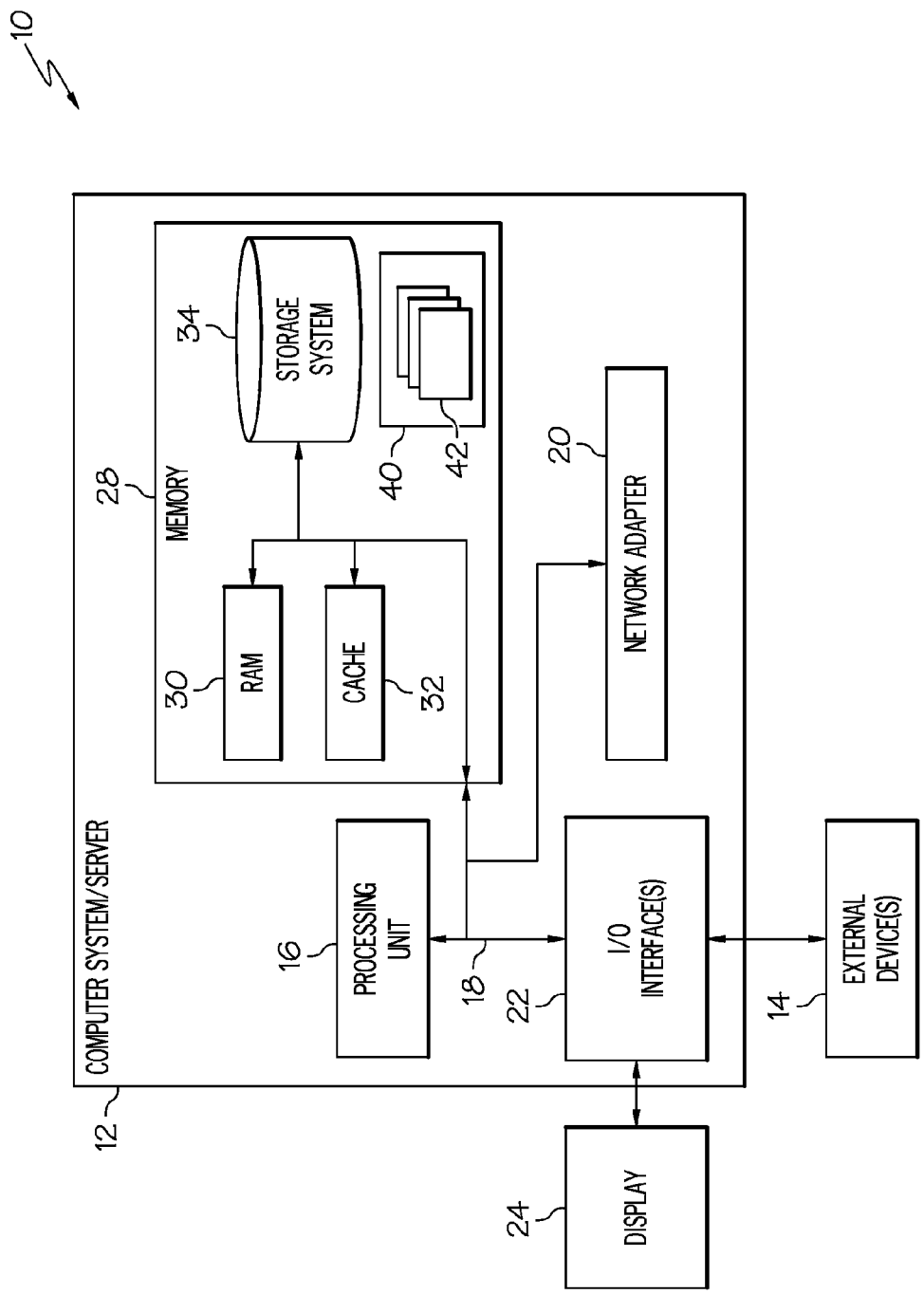
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
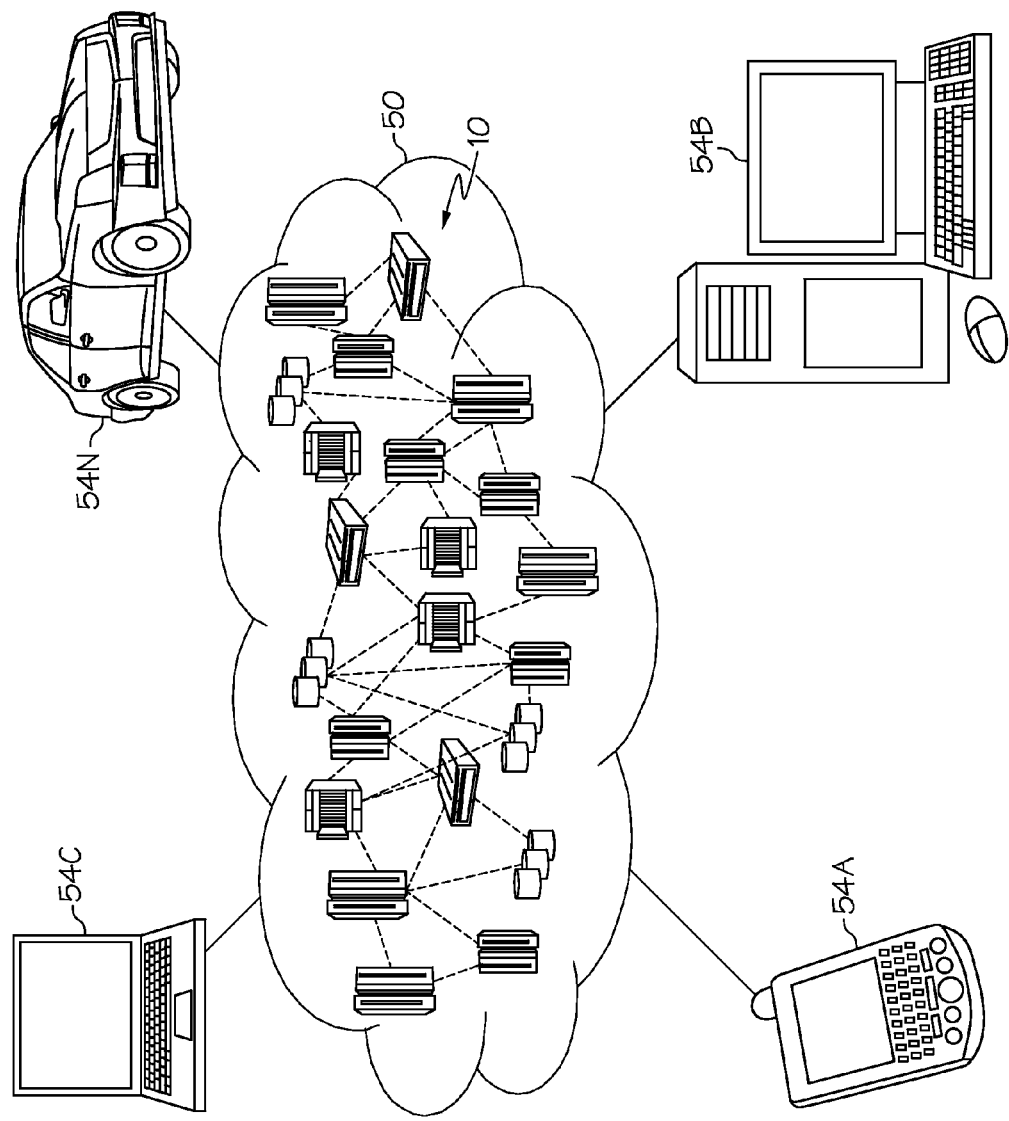
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 8:
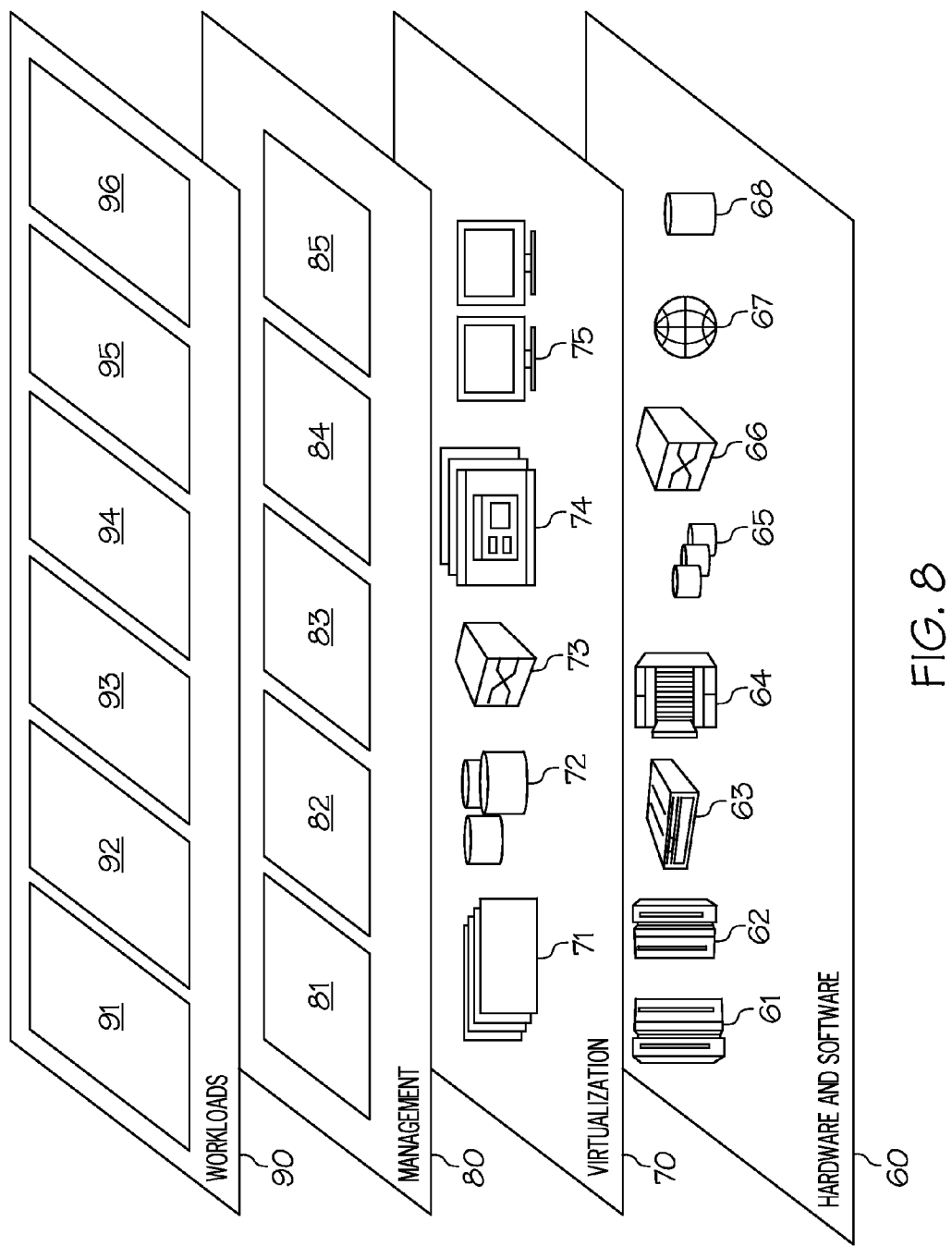
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic calendar modification processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A system for adjusting an electronic calendar, wherein the system comprises a calendar adjusting device that comprises:
    a network interface to a communication link between the calendar adjusting device and an electronic calendar server that serves an electronic calendar, wherein the electronic calendar comprises a calendar entry for a scheduled event that a user of the electronic calendar is slated to participate in with at least one other person, and wherein the calendar entry is associated with metadata that describe a scheduled time and date for the scheduled event and a non-temporal attribute of the scheduled event;
    user monitoring hardware that monitors a cognitive state of the user of the electronic calendar;
    an electronic calendar modification logic, wherein the electronic calendar modification logic generates and transmits, via the communication link between the calendar adjusting device and the electronic calendar server, a modification to the calendar entry based on the metadata and the user's cognitive state, wherein the calendar adjusting device adjusts the calendar entry in the electronic calendar;
    an alarm clock, wherein the alarm clock comprises:
        a reminder annunciation instruction generator that generates a reminder annunciation instruction for the scheduled event, wherein the reminder annunciation instruction generator transmits the reminder annunciation instruction to one or more annunciation emitters;
a primary annunciation emitter that emits, in response to receiving the reminder annunciation instruction, a reminder annunciation for the scheduled event, wherein the primary annunciation emitter in the alarm clock is a speaker; and
a reminder annunciation response device, wherein the reminder annunciation response device is a hardware device that detects a physiological response of the user to the reminder annunciation, wherein the electronic calendar modification logic further generates and transmits additional modifications to the calendar entry based on the user's physiological response to the reminder annunciation;
a proximate non-user detector, wherein the proximate non-user detector receives a signal from a non-user positioning device that identifies a location of a non-user of the alarm clock; and
an annunciator selector, wherein the annunciator selector, in response to the proximate non-user detector determining that the non-user is proximate enough to the alarm clock to hear the primary annunciation emitter, cancels the transmission of the reminder annunciation instruction to the primary annunciation emitter and transmits the reminder annunciation instruction to a secondary annunciation emitter, wherein transmitting the reminder instruction to the secondary annunciation emitter causes the secondary annunciation emitter to generate the reminder annunciation in a manner that is imperceptible to the non-user of the alarm clock.

2. The system of claim 1, wherein the reminder annunciation response device is a reminder annunciation control button on the alarm clock.

3. The system of claim 1, wherein the reminder annunciation response device is a biometric sensor on a user of the alarm clock.

4. The system of claim 1, wherein the alarm clock further comprises:
a reminder annunciation database of reminder annunciations, wherein each of the reminder annunciations is associated with a particular non-temporal attribute of one or more events; and
a reminder annunciation selector, wherein the reminder annunciation selector selects, from the database of reminder annunciations, a reminder annunciation that matches the non-temporal attribute of the scheduled event, and wherein the reminder annunciation instruction generator generates a particular reminder annunciation that matches the non-temporal attribute of the scheduled event.

5. The system of claim 1, wherein the calendar adjusting device further comprises:
a calendar entry evaluation logic, wherein the calendar entry evaluation logic identifies a subject of the scheduled event based on the non-temporal attribute of the scheduled event, and wherein the reminder annunciation instruction generator adjusts a time at which the reminder annunciation for the calendar entry is emitted based on the subject of the scheduled event.

6. The system of claim 1, wherein the reminder annunciation is audible, and wherein the primary annunciation emitter in the alarm clock is from a group of emitters that comprises a speaker, a light display, and a scent emitter.

7. The system of claim 1, further comprising:
a snooze button on the alarm clock that delays the reminder annunciation, wherein the reminder annunciation response device detects the user pressing the snooze button more than a predetermined number of times within a predefined time period, wherein the user monitoring hardware determines that the user is ill based on the user pressing the snooze button more than the predetermined number of times within the predefined time period, and wherein the calendar adjusting device further adjusts the calendar entry based on the user being in a particular physiological state.

8. The system of claim 1, further comprising:
a biometric sensor that monitors the user of the alarm clock, wherein the biometric sensor detects that the user of the alarm clock is ill, and wherein the calendar adjusting device further adjusts the calendar entry based on the user being ill.

9. The system of claim 1, wherein the scheduled event is a meeting, wherein the non-temporal attribute is a description of scheduled participants of the meeting, and wherein the modification to the calendar entry is further based on the scheduled participants of the meeting.

10. The system of claim 1, further comprising:
a positioning hardware device that identifies a geophysical location of a user of the calendar adjusting device; and
an interface to a traffic information server, wherein the traffic information server provides real-time information about vehicular traffic between the user and a location of the scheduled event, wherein the electronic calendar modification logic adjusts the calendar entry based on the real-time information about the vehicular traffic between the geophysical location of the user and the location of the scheduled event.

11. The system of claim 1, wherein the calendar adjusting device further comprises:
an interface to a weather information server, wherein the weather information server provides real-time information about weather at a location of the scheduled event, wherein the calendar adjusting device adjusts the calendar entry based on the real-time information about the weather at the location of the scheduled event.

12. A method for modifying an electronic calendar, the method comprising:
accessing an electronic calendar by a calendar adjusting device, wherein the electronic calendar comprises a calendar entry for a scheduled event, wherein an alarm clock comprising a primary annunciation emitter emits a reminder annunciation for an event represented by the calendar entry, wherein the primary annunciation emitter in the alarm clock is a speaker, wherein the electronic calendar is served by an electronic calendar server, and wherein the calendar entry is associated with metadata that describe a scheduled time and date for the scheduled event and a non-temporal attribute of the scheduled event, wherein the scheduled event is a meeting with at least one other person, and wherein the non-temporal attribute of the meeting is an attribute from a group consisting of a level of importance of the meeting, an ability of the meeting to be rescheduled, and an amount of preparation time required for the meeting;
monitoring a cognitive state of a user of the electronic calendar;
generating and transmitting, via a communication link between a calendar adjusting device and the electronic calendar server, a modification to the calendar entry based on the user's cognitive state;

adjusting, by the calendar adjusting device, the calendar entry in the electronic calendar;

generating a reminder annunciation instruction for the scheduled event, wherein the reminder annunciation instruction is transmitted to one or more annunciation emitters;

emitting, by the primary annunciation emitter and in response to receiving the reminder annunciation instruction, the reminder annunciation for the scheduled event;

detecting, by reminder annunciation response device, a physiological response of the user to the reminder annunciation;

generating and transmitting additional modifications to the calendar entry based on the user's physiological response to the reminder annunciation;

receiving, by a proximate non-user detector within the alarm clock, a signal from a non-user positioning device that identifies a location of a non-user of the alarm clock; and cancelling, in response to the proximate non-user detector determining that the non-user is proximate enough to the alarm clock to hear the primary annunciation emitter, a transmission of the reminder annunciation instruction to the primary annunciation emitter and transmitting the reminder annunciation instruction to a secondary annunciation emitter, wherein transmitting the reminder annunciation instruction to the secondary annunciation emitter causes the secondary annunciation emitter to generate the reminder annunciation in a manner that is imperceptible to the non-user of the alarm clock.

13. The method of claim 12, wherein each reminder annunciation from a reminder annunciation database of reminder annunciations is associated with a particular non-temporal attribute of one or more events, and wherein the method further comprises:

selecting, from the database of reminder annunciations, a reminder annunciation that matches the non-temporal attribute of the scheduled event; and generating a particular reminder annunciation that matches the non-temporal attribute of the scheduled event.

14. The method of claim 12, further comprising:

identifying a subject of the scheduled event based on the non-temporal attribute of the scheduled event; and further adjusting a time of the calendar entry based on the subject of the scheduled event.

15. The method of claim 12, wherein the non-temporal attribute is a description of scheduled participants of the meeting, and wherein the method further comprises:

further adjusting a time of the calendar entry based on the scheduled participants of the meeting.

16. A computer program product for modifying an electronic calendar, the computer program product comprising a computer readable storage medium having program code embodied therewith, wherein the computer readable storage medium is not a transitory signal per se, and wherein the program code is readable and executable by a processor to perform a method comprising:

accessing an electronic calendar from a calendar adjusting device, wherein the electronic calendar comprises a calendar entry for a scheduled event that a user of the electronic calendar is slated to participate in with at least one other person, wherein an alarm clock comprising a primary annunciation emitter emits a reminder annunciation for an event represented by the calendar entry, wherein the primary annunciation emitter in the alarm clock is a speaker, wherein the electronic calendar is served by an electronic calendar server, and wherein the calendar entry is associated with metadata that describe a scheduled time and date for the scheduled event and a non-temporal attribute of the scheduled event;

monitoring a cognitive state of the user of the electronic calendar;

generating and transmitting, via a communication link between a calendar adjusting device and the electronic calendar server, a modification to the calendar entry based on the user's cognitive state;

adjusting, by the calendar adjusting device, the calendar entry in the electronic calendar;

generating a reminder annunciation instruction for the scheduled event, wherein the reminder annunciation instruction is transmitted to one or more annunciation emitters;

emitting, by the primary annunciation emitter and in response to receiving the reminder annunciation instruction, the reminder annunciation for the scheduled event;

detecting, by a reminder annunciation response device, a physiological response of the user to the reminder annunciation;

generating and transmitting additional modifications to the calendar entry based on the user's physiological response to the reminder annunciation;

receiving, by a proximate non-user detector within the alarm clock, a signal from a non-user positioning device that identifies a location of a non-user of the alarm clock; and cancelling, in response to the proximate non-user detector determining that the non-user is proximate enough to the alarm clock to hear the primary annunciation emitter, a transmission of the reminder annunciation instruction to the primary annunciation emitter and transmitting the reminder annunciation instruction to a secondary annunciation emitter, wherein transmitting the reminder annunciation instruction to the secondary annunciation emitter causes the secondary annunciation emitter to generate the reminder annunciation in a manner that is imperceptible to the non-user of the alarm clock.

* * * * *